Feb. 28, 1956 M. G. LYNCH 2,736,158
FRUIT PICKING DEVICE
Filed Jan. 7, 1955
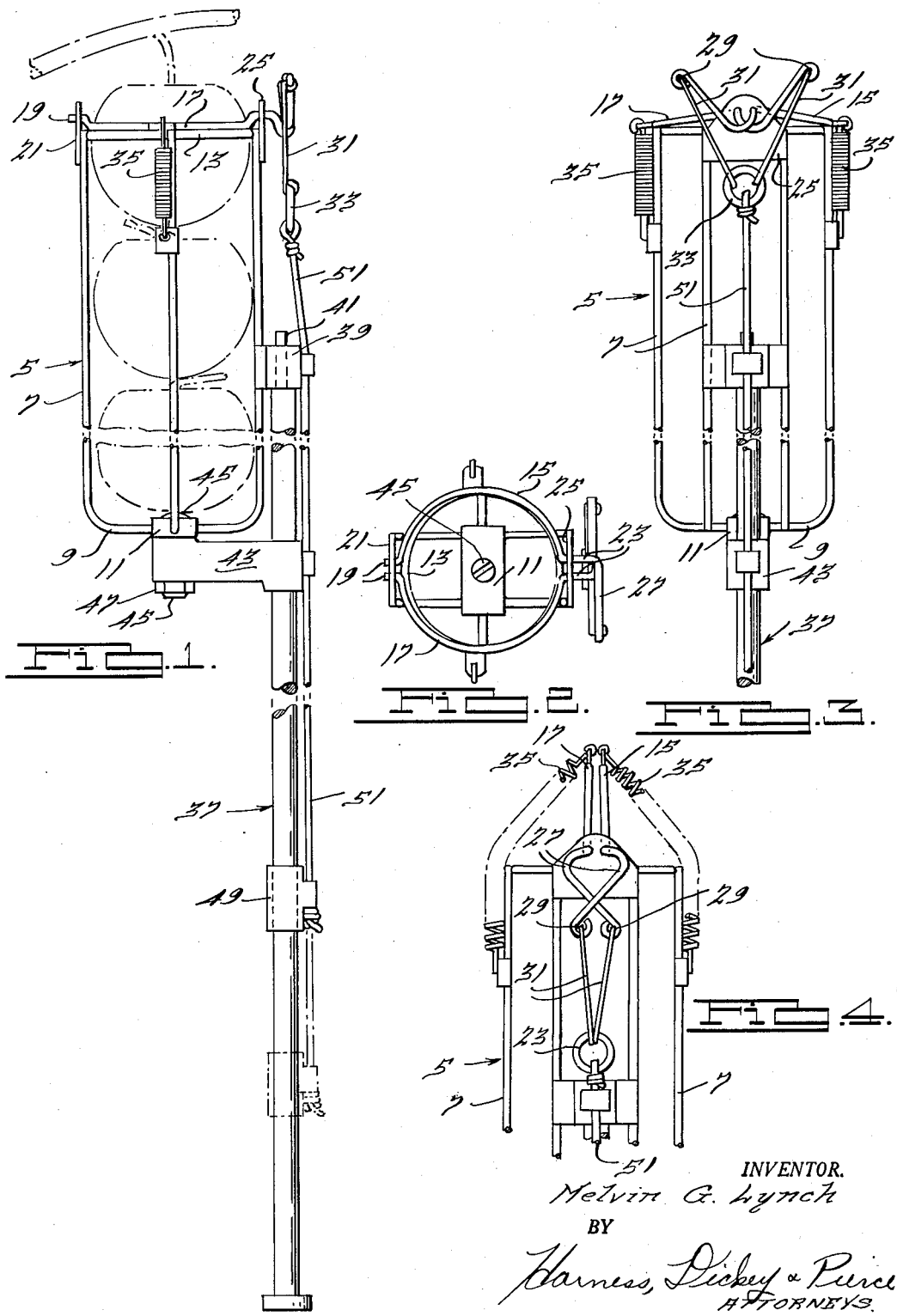
INVENTOR.
Melvin G. Lynch
BY
Harness, Dickey & Pierce
ATTORNEYS.

United States Patent Office 2,736,158
Patented Feb. 28, 1956

2,736,158

FRUIT PICKING DEVICE

Melvin G. Lynch, Wood River, Nebr.

Application January 7, 1955, Serial No. 480,399

1 Claim. (Cl. 56—333)

This invention relates generally to fruit picking devices and more particularly to a device for picking fruit from trees in such a manner that the stem will be on the fruit after it has been picked.

It is an object of this invention to provide a fruit picking device of the aforementioned type which is relatively light in weight, inexpensive to manufacture, durable in construction and which may be used to pick fruit from trees.

It is a further object of this invention to provide a fruit picking device of the aforementioned type which is constructed so that it may pick fruit from a tree while leaving the stem on the fruit, and in which a basket is provided so that several fruit may be collected in the basket before it is necessary to empty the same.

It is a still further object of this invention to provide a fruit picking device of the aforementioned type which is constructed so that a person standing on the ground or on a ladder may pick fruit growing high in trees and fruit lying in dense or normally inaccessible portions of the trees.

It is a still further object of this invention to provide a fruit picking device of the aforementioned type in which the fruit will not be damaged when picked and which will permit more rapid picking of the fruit than has been heretofore possible.

These and other objects of this invention will become apparent from the following detailed description, taken in conjunction with the accompanying drawing, in which:

Figure 1 is a fragmentary side elevational view of the structure of this device;

Fig. 2 is a top plan view of the structure illustrated in Figure 1;

Fig. 3 is a fragmentary front elevational view of the structure illustrated in Fig. 1, illustrating the jaws in an open position; and Fig. 4 is a fragmentary front elevational view of the structure illustrated in Fig. 1, with the jaws in a closed position.

Referring now to the drawing, it will be seen that the fruit picking device includes an open top, framelike basket 5 formed from a plurality of circumferentially spaced, longitudinally extending wires 7, the lower ends of which are bent radially inwardly at 9 and interconnected in a suitable junction block or by welding at 11 to provide the bottom of the basket. A wire ring 13 extends around and is suitably connected to the upper ends of the wires 7 to form the top of the basket. A pair of opposed wire jaws 15 and 17 are provided above the top of the basket and each jaw is preferably made from a single piece of wire which, in its normal open position, extends around the top of the basket and outside of the inner periphery of the basket. Each jaw has one end bent to provide a straight arm or axle portion 19. The jaw portions 19 are journalled in a plate or bracket 21 secured to the basket adjacent the top thereof by any suitable means. The opposite end of each of the jaws 15 and 17 has an armlike portion 23 which extends through and is journalled in a bracket 25 which is secured to the basket adjacent the top thereof.

Extending from each of the jaw arm portions 23, outwardly of the basket, is a crank arm portion 27, the outer ends of which are bent to provide eyes 29. A link member 31 has its upper end connected with the eye portions 29 of each of the jaw crank portions in any suitable way, such as by providing an interengaging loop on the upper end thereof. The lower end of each link 31 is connected with a ring 33 in any suitable manner such as by looping the lower ends of the links 31 around the ring. Suitable springs such as coil springs 35 are connected with the jaws 15 and 17 and with the basket 5 below the upper end thereof. The springs normally retain the jaws in an open position such as illustrated in Fig. 3, wherein the jaws lie in a plane substantially parallel to the plane of the top of the basket. The basket is preferably made in two sizes, one four inches in diameter and the other six inches in diameter, and is approximately sixteen inches long. The open basket construction enables a user of the device to see the fruit in the basket and the basket will hold approximately seven apples. Thus, the user can easily tell when the basket must be emptied. Also, the shape of the basket and the arrangement of the jaws permits the device to easily pick fruit from a tree where the fruit is lying close to a tree limb or in areas where the branches are extremely dense. The picking device is designed to be used from the ground or from a ladder and is provided with an elongated handle 37 which may vary in length from approximately six to twelve feet. The handle is substantially rigid and is removably connected with the basket. In this connection a bracket 39 is connected with the basket member 7 above the bottom thereof and is suitably apertured to receive a reduced upper end portion 41 on the handle. A laterally extending arm 43 is rigidly connected with the handle below the upper end thereof and the free end of the arm is adapted to be connected with the bottom of the basket in any suitable manner. In the illustrated embodiment a cap screw or bolt 45 is connected to the bottom of the basket and extends downwardly therefrom through an aperture in the free end of the arm 43. A nut 47 is then threaded on the lower end of the screw or bolt 45 to releasably lock the basket to the handle.

A sleeve 49 is slidably supported on the handle 37 and has a rope 51 connected thereto. The upper end of the rope is connected to the ring 33 so that the user of the picking device may place one hand on the lower portion of the handle and one hand on the sleeve, and upon sliding the sleeve downwardly along the handle the jaws will move to the closed position illustrated in Fig. 4, wherein they will engage the stem of a fruit in a tree, such as an apple, so that upon downward movement of the fruit picking device the fruit will be picked from the tree with the stem still attached to the fruit and when the sleeve is released the apple, with the stem attached to it, will drop into the basket.

It has been found that this fruit picker, without the handle connected thereto, weighs only about one and three-quarters pounds, thus making the same very light in weight and yet durable in construction, so that it may be easily operated from the ground or from a ladder, to properly pick fruit and leave the stem attached thereto, as required by law in some states.

What is claimed is:

A fruit picking device including an open top, wire, framelike basket formed of wire rod and adapted to receive and support a plurality of fruit having stems, such as apples, said basket including a plurality of circumferentially spaced, longitudinally extending, wirelike rod members interconnected adjacent one end thereof to provide a basket bottom, an annular wire member interconnecting said circumferentially spaced wire members adjacent the opposite end thereof and forming the top of said basket, a pair of wire jaws each composed of a single piece of wire hingedly connected with said basket adjacent the top thereof, spring means connected between each of said jaws and said basket normally retaining said jaws in an open position on opposite sides of said basket, each of said jaws including a crank arm portion disposed outwardly of said basket, a link member connected to each of said crank portions, a ringlike member connected with the free end of each of said link members, an elongated, rigid handle member releasably connected with said basket adjacent the bottom thereof and adjacent one side thereof above said bottom, a sleeve slidably supported on said handle, a ropelike member connected with said sleeve and with said ring member so that downward movement of said sleeve and said handle will cause said jaws to swing together and close about a fruit and engage the stem thereof so that thereafter downward movement of the picking device will remove the fruit with the stem thereon so that the fruit may drop into the basket without damage.

References Cited in the file of this patent

UNITED STATES PATENTS

| | | |
|---|---|---|
| 442,928 | Walker | Dec. 16, 1890 |
| 467,687 | Matlock | Jan. 26, 1892 |
| 888,459 | Bolinski | May 26, 1908 |
| 1,744,614 | Crank | Jan. 21, 1930 |

FOREIGN PATENTS

| | | |
|---|---|---|
| 973,103 | France | Sept. 6, 1950 |